United States Patent
Mizoguchi et al.

(10) Patent No.: US 10,394,275 B2
(45) Date of Patent: *Aug. 27, 2019

(54) ELECTRONIC DEVICE HAVING A MEMBER FOR CHASSIS

(71) Applicant: LENOVO (SINGAPORE) PTE. LTD., Singapore (SG)

(72) Inventors: Fumitake Mizoguchi, Kanagawa-ken (JP); Takehito Yamauchi, Kanagawa-ken (JP); Tatsuya Ushioda, Kanagawa-ken (JP); Keita Ishikawa, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 282 days.

This patent is subject to a terminal disclaimer.

(21) Appl. No.: 15/254,095

(22) Filed: Sep. 1, 2016

(65) Prior Publication Data

US 2017/0068271 A1    Mar. 9, 2017

(30) Foreign Application Priority Data

Sep. 4, 2015  (JP) .................................. 2015-174868

(51) Int. Cl.
 *B32B 3/24*  (2006.01)
 *G06F 1/16*  (2006.01)
 *B32B 3/26*  (2006.01)

(52) U.S. Cl.
 CPC .......... *G06F 1/1616* (2013.01); *G06F 1/1681* (2013.01); *B32B 3/266* (2013.01)

(58) Field of Classification Search
 CPC ............................... B32B 3/266; G06F 1/1616
 See application file for complete search history.

(56) References Cited

U.S. PATENT DOCUMENTS

| | | | | |
|---|---|---|---|---|
| 2011/0007459 | A1* | 1/2011 | Wang | ................ B29C 45/14377 361/679.01 |
| 2013/0285516 | A1* | 10/2013 | Mizoguchi | ............... H05K 5/02 312/7.2 |
| 2017/0308119 | A1* | 10/2017 | Mizoguchi | .............. B32B 3/266 |

FOREIGN PATENT DOCUMENTS

| | | |
|---|---|---|
| CN | 101640993 A | 2/2010 |
| CN | 103144243 A | 6/2013 |
| JP | 2002-118371 A | 4/2002 |
| JP | 2006-297929 A | 11/2006 |
| JP | 2013-232052 A | 11/2013 |

* cited by examiner

*Primary Examiner* — William P Watkins, III
(74) *Attorney, Agent, or Firm* — Antony P. Ng; Russell Ng PLLC

(57) ABSTRACT

A member for chassis capable of achieving high strength is disclosed. The member for chassis is used for a chassis making up a lid of an electronic device in which the lid and the body are coupled with each other openably/closably via a hinge. The member for chassis has a configuration in which a frame formed of thermoplastic resin is joined with at least a part of an outside end face of a laminated plate including an intermediate layer disposed between a pair of fiber-reinforced resin plates, wherein the thermoplastic resin extends to a surface of the laminated plate and a nut serving as a female thread part is provided in the thermoplastic resin extending to the surface of the laminated plate.

20 Claims, 5 Drawing Sheets

ELECTRONIC DEVICE HAVING A MEMBER FOR CHASSIS

PRIORITY CLAIM

The present application claims benefit of priority under 35 U.S.C. § 120, 365 to the previously filed Japanese Patent Application No. JP2015-174868 with a priority date of Sep. 4, 2015, which is incorporated by reference herein.

BACKGROUND OF THE INVENTION

1. Technical Field

The present invention relates to electronic devices in general, and particularly to an electronic device having a member for chassis.

2. Description of Related Art

Chassis of various types of electronic devices, such as a laptop personal computer (laptop PC), a tablet personal computer (tablet PC), a smartphone, and a mobile phone are required to be lightweight and thin and have high strength. To this end, a sheet-like member for chassis including a prepreg plate containing reinforcement fibers, such as carbon fibers, impregnated with thermosetting resin, such as epoxy resin (a fiber-reinforced resin plate) and an intermediate layer made of a foam material, for example, sandwiched therein is widely employed as electronic device chassis.

When the above-mentioned type of laminated plate is employed as a chassis of a laptop PC or the like, it is necessary to perform desired shape machining to form a wall or the like at least on the periphery of the laminated plate. The laminated plate, however, is formed by using a hard fiber-reinforced resin plate and therefore is low in the degree of freedom in shape machining such as bending.

When a member for chassis is coupled and fixed to another member for chassis to form a single chassis, a nut forming a female thread part is insert-molded in the thermoplastic resin portion that is joined with the laminated plate. In this configuration, however, the nut is disposed in the thermoplastic resin portion joined in the outside of the outside end face of the laminated plate. Therefore, when an impact or an external force is applied to the chassis, the impact or external force is directly transmitted from the thread fastening two members for chassis to each other to the thermoplastic resin portion via the nut. As a result, large load tends to be applied to the thermoplastic resin portion lower in strength than the laminated plate portion having high strength or to a joint interface between the thermoplastic resin portion and the laminated plate, thereby requiring a member for chassis to have even higher strength of the chassis.

Consequently, it would be desirable to provide an improved member for chassis capable of achieving high strength.

SUMMARY OF THE INVENTION

In accordance with a preferred embodiment of the present invention, there is provided a member for chassis in which thermoplastic resin is joined with at least a part of an outside end face of a laminated plate including an intermediate layer disposed between a pair of fiber-reinforced resin plates, wherein the thermoplastic resin extends to a surface of the laminated plate and a female thread part is provided in the thermoplastic resin extending to the surface of the laminated plate.

With this configuration, the provision of the female thread part in the thermoplastic resin extending from the outside end face of the laminated plate to the surface enables the female thread part to be disposed so as to overlap the laminated plate having higher strength than the portion formed of the thermoplastic resin, thereby integrating the laminated plate having high strength with the female thread part. For example, even in the ease where an external force or an impact in the bending direction is applied to the laminated plate, the external force or the like can be received by the laminated plate since the female thread part is present on the laminated plate. This prevents large load from being applied to the portion formed of thermoplastic resin lower in strength than the laminated plate or to the joint interface between the thermoplastic resin portion and the outside end face of the laminated plate, thereby achieving a chassis having high strength.

The female thread part may be a nut integrated with the thermoplastic resin by insert-molding.

The laminated plate may include a recess formed by digging the surface of one fiber-reinforced resin plate in a thickness direction, and the nut may be disposed in the recess at its axial one end. This enables a reduction in the projection height of the nut from the surface of the laminated plate and thus enables a reduction in the thickness of the member for chassis and the thickness of the chassis including the member for chassis as far as possible.

The nut may include a flange part projecting in an outer diameter direction from one axial portion of its outer peripheral face, and the flange part may be disposed so that the back surface thereof abuts on the surface of one fiber-reinforced resin plate and at least a part of the surface of the flange part may be covered with the thermoplastic resin. As such, the recess can be closed with the flange part, preventing the thermoplastic resin from entering the recess to affect the intermediate layer or the like. Moreover, the surface of the flange part is covered, with the thermoplastic resin, thereby preventing the nut from slipping off upward.

An irregular shape may be provided on an outer peripheral end face of the flange part. When the fixing screw is screwed together with the nut, the thermoplastic resin entering a portion having the irregular shape provides the detent of the nut.

The laminated plate may include a recess formed by digging the surface of one fiber-reinforced resin plate in the thickness direction and the nut may be covered with the thermoplastic resin filled into the recess at least at its axial one end. This configuration also enables a reduction in the projection height of the nut from the surface of the laminated plate and thus enables a reduction in the thickness of the member for chassis and the thickness of the chassis including the member for chassis as far as possible.

The laminated plate may include a through-hole penetrating through the pair of fiber-reinforced resin plates and the intermediate layer in the thickness direction, and the nut may be covered with the thermoplastic resin filled into the through-hole at least at its axial one end. This configuration also enables a reduction in the projection height of the nut from the surface of the laminated plate and thus enables a reduction in the thickness of the member for chassis and the thickness of the chassis including the member for chassis as far as possible.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
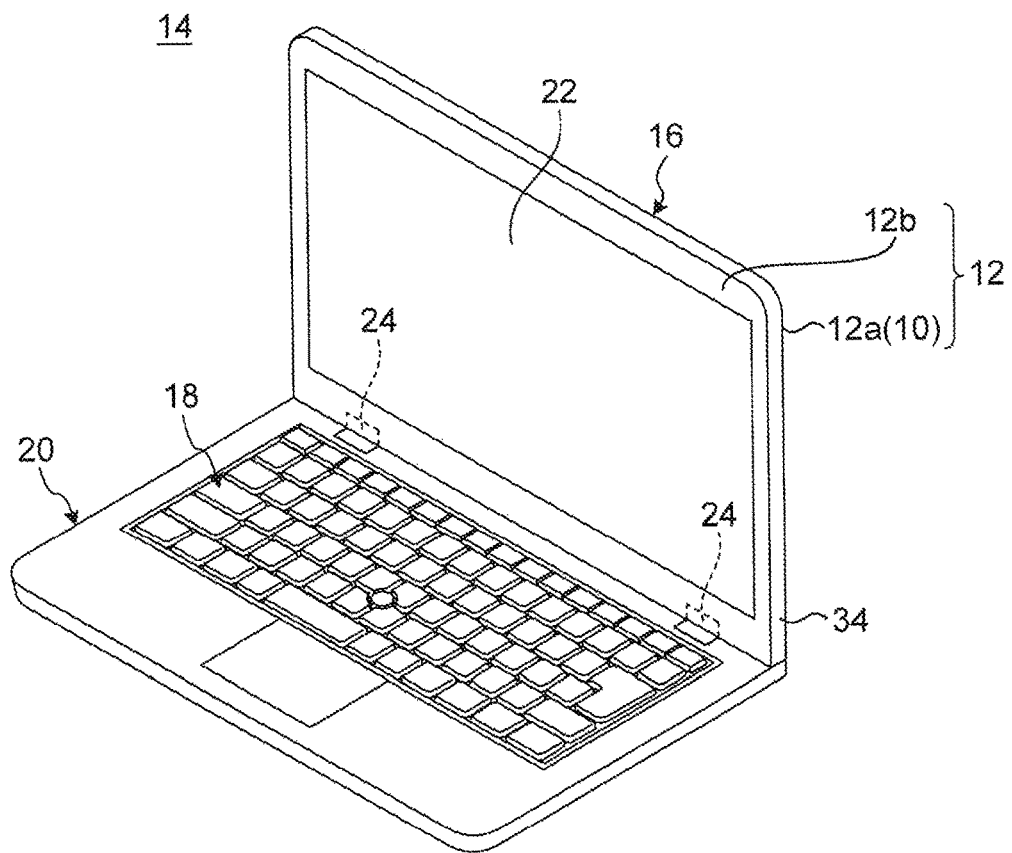
FIG. 1 is a perspective view of an electronic device in which a preferred embodiment of the present invention is incorporated.

Referring now to the drawings and in particular to FIG. 1, there is depicted a perspective view of an electronic device 14 having a chassis 12 that includes a member for chassis 10 according to a preferred embodiment of the present invention. The present embodiment shows the configuration as one example in which the chassis 12 including the member for chassis 10 is used as a lid 16 of the electronic device 14 that is a laptop PC.

As shown in FIG. 1, the electronic device 14 includes the body (body to chassis) 20 having a keyboard device 18 and a rectangular flat-plate like lid 16 having a display device 22 including a liquid crystal display or the like. The electronic device 14 is of a clam shell type in which the lid 16 is coupled with the body 20 via right and left hinges 24 openably/closably.

The body 20, which is a flat and boxy chassis, internally stores various types of electronic components not illustrated, such as a board, an arithmetic processing unit, a hard disk device and a memory. The keyboard device 18 is disposed on the top face of the body 20.

The lid 16 includes the chassis 12 formed by stacking and coupling the rear-face cover 12a and the front-face cover 12b together and is electrically connected to the body 20 via a cable not illustrated passing through the hinges 24. The rear-face cover 12a is a cover member that covers a side face and a rear face of the lid 16, and is made up of the member for chassis 10 according to the present embodiment. The lid 16 is coupled with the body 20 via the hinges 24 screwed and fixed to the rear-face cover 12a (see FIG. 2, too). The front-face cover 12b is a cover member made of resin that covers the front face of the lid 16, and is provided with a hole in the most part such as, for example, in a part exposing the display device 22 formed of a liquid crystal display.

The following describes the configuration of the rear-face cover 12a of the chassis 12 that forms the lid 16 and the member for chassis 10 that forms the rear-face cover 12a in details.

Figure 2:
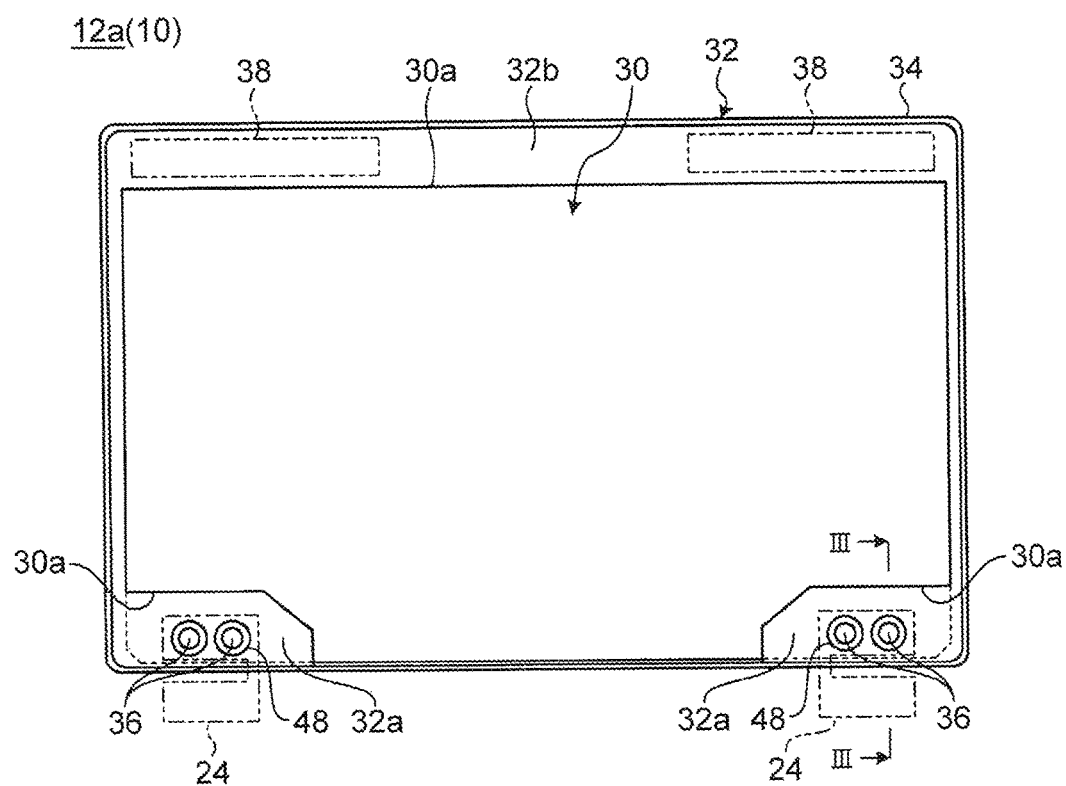
FIG. 2 is a plan view of a rear-face cover of the chassis of the electronic device from FIG. 1.

FIG. 2 is a plan view of the rear-face cover 12a of the chassis 12, which is a view of the rear-face cover 12a as a rear face of the lid 16 from the inner face side. As described above, the rear-face cover 12a is made up of the member for chassis 10. As shown in FIG. 2, the member for chassis 10 includes a laminated plate 30 formed to be lightweight and high strength in a trilaminar structure and a frame part 32 formed by joining thermoplastic resin with the outside end face 30a of the laminated plate 30. Regarding the rear-face cover 12a, the frame part 32 of the member for chassis 10 as described above forms the periphery and the wall 34 serving as side faces of the four sides of the rear-face cover 12a, and the laminated plate 30 forms a plate-like portion supporting the rear face of the display device 22.

In the chassis 12 (lid 16), the hinge 24 is fixed to each of a pair of right and left wide parts 32a provided, on the frame part 32 on one edge side (lower edge in FIG. 2) of the rear-face cover 12a by using the a plurality of (two in FIG. 2) fixing screws 36. Moreover, a strip part 32b extending in the horizontal direction is provided on the frame part 32 on the other edge side (upper edge in FIG. 2) of the rear-face cover 12a and antennas 38 for wireless communication are disposed in this part.

Figure 3:
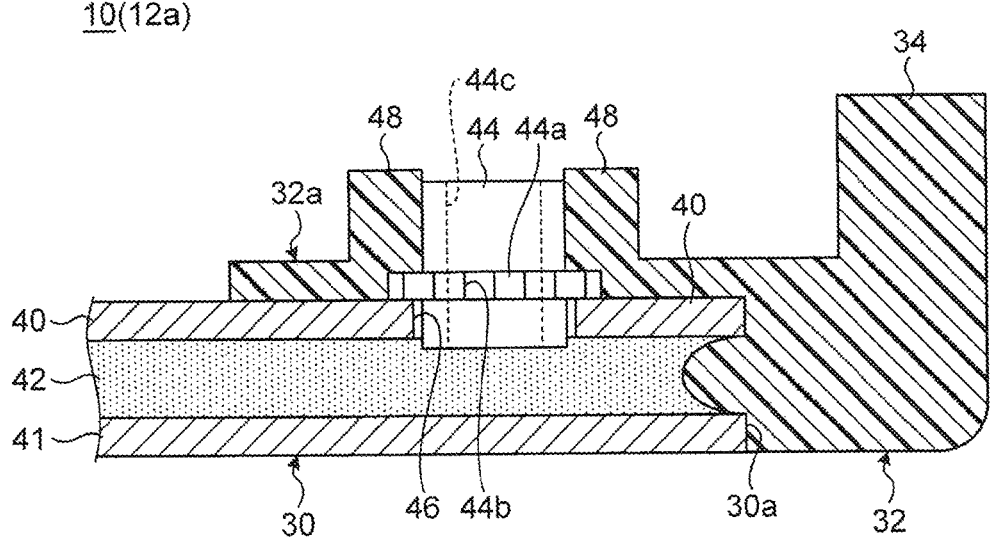
FIG. 3 is a cross-sectional view taken along the line III-III of FIG. 2.
Figure 4:
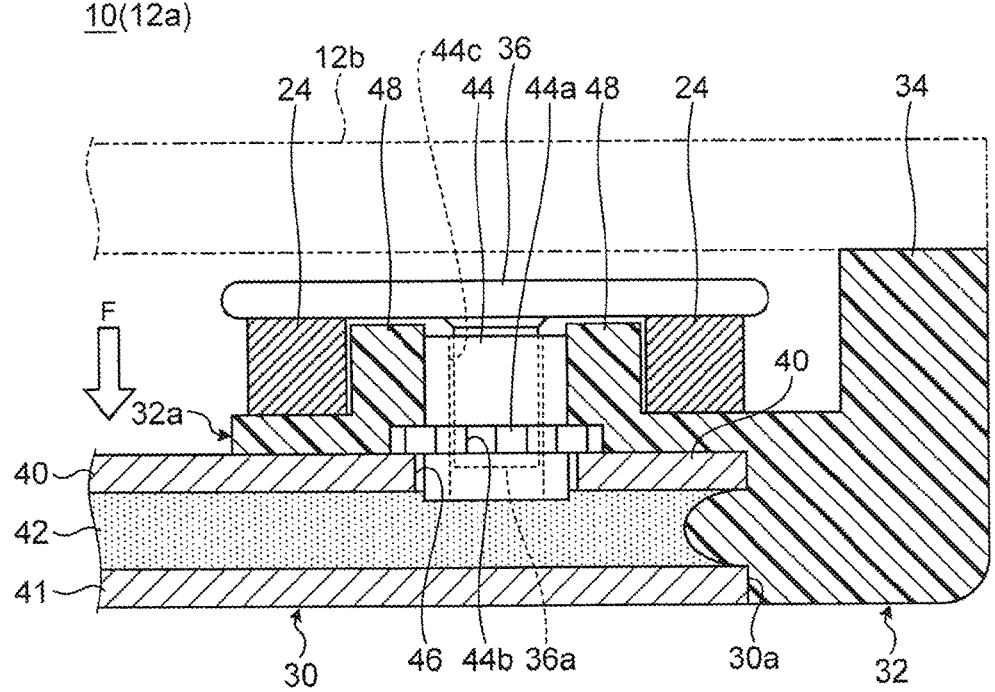
FIG. 4 is a cross-sectional view showing a state where a hinge is fixed by using a fixing screw in the member for chassis shown in FIG. 3.

Subsequently, the configuration of the member for chassis 10 making up the rear-face cover 12a is described in details. FIG. 3 is a cross-sectional view in the thickness direction of a portion including the laminated plate 30 and the frame part 32 (wide part 32a) of the member for chassis 10, where FIG. 3 is a cross-sectional view schematically showing a cross section taken along the line of FIG. 2. Moreover, FIG. 4 is a cross-sectional view showing a state where the hinge 24 is fixed by using a fixing screw 36 for the member for chassis 10 shown in FIG. 3.

As shown in FIG. 3, the member for chassis 10 includes a laminated plate 30 in which the intermediate layer 42 is disposed between a pair of upper and lower fiber-reinforced resin plates 40 and 41 and a frame part 32 joined with the outside end face 30a of the laminated plate 30.

Each of the fiber-reinforced resin plates 40 and 41 is prepreg containing reinforcement fibers impregnated with thermosetting resin, such as epoxy resin, has a thickness of about 0.3 min, for example. In the present embodiment, carbon fiber-reinforced resin (CFRP), which includes carbon fibers as reinforcement fibers, is used. Instead of carbon fibers, other reinforcement fibers may be used, which include metal fibers such as stainless-steel fibers, inorganic fibers such as glass fibers, and other various types of materials.

The intermediate layer 42, which is provided between a pair of fiber-reinforced resin plates 40 and 41, is a soft spacer for separating the hard fiber-reinforced resin plates 40 and 41 and has a thickness of about 0.6 mm, for example. Such an intermediate layer 42 leads to an increase in modulus of section of the laminated plate 30 in the thickness direction, and the laminated plate 30 can be lightweight and have a high-strength structure. The intermediate layer 42 is made of a foamed layer including a formed sheet such as polypropylene or of a fiber layer made of carbon fibers that are collected while having a compressible gap.

The frame part 32 is joined with the laminated plate 30 by injection-molding the thermoplastic resin on the outside end face 30a of the laminated plate 30 as described above. The thermoplastic resin forming the frame part 32 is preferably polyethylene resin, polypropylene resin, or the like, for example, or may be fiber-reinforced resin (for example, GFRP) in which glass fibers or other reinforcement fibers are contained in the above resin. In this embodiment, the thermoplastic resin forming the frame part 32 is injection-molded so as to infiltrate the intermediate layer 42 disposed between the fiber-reinforced resin plates 40 and 41, thereby generating an anchor effect to secure high joining strength.

The frame part 32 joined as described above enables desired shape machining such as forming the wall 34 or the like in the periphery of the laminated plate 30 that is low in the degree of freedom in machining such as bending or cutting. Moreover, the joining also enables an increase in the degree of freedom in design such that the antenna 38 is installed in the frame part 32 made of nonconductive material in a position off the fiber-reinforced resin plates 40 and 41 made of conductive material (see FIG. 2). Although FIG. 2 illustrates the configuration where the frame part 32 is provided on the whole circumference of the outside end face 30*a* of the laminated plate 30, the frame part 32 may be joined with only a part of the outside end face 30*a*.

As shown in FIGS. 3 and 4, the wide part 32*a* of the frame part 32, to which the hinge 24 is screwed and fixed with the fixing screw 36, is formed by extending the thermoplastic resin joined with the outside end face 30*a* of the laminated plate 30 to the surface of the laminated plate 30 (the surface of one fiber-reinforced resin plate 40). In addition, a nut 44, which serves as a female thread part for screwing the fixing screw 36, is insert-molded into the wide part 32*a* made of thermoplastic resin extended to the surface of the laminated plate 30, thereby enabling the hinge 24 to be screwed and fixed. In other words, the nut 44 is disposed on the surface of the laminated plate 30.

Figure 5:
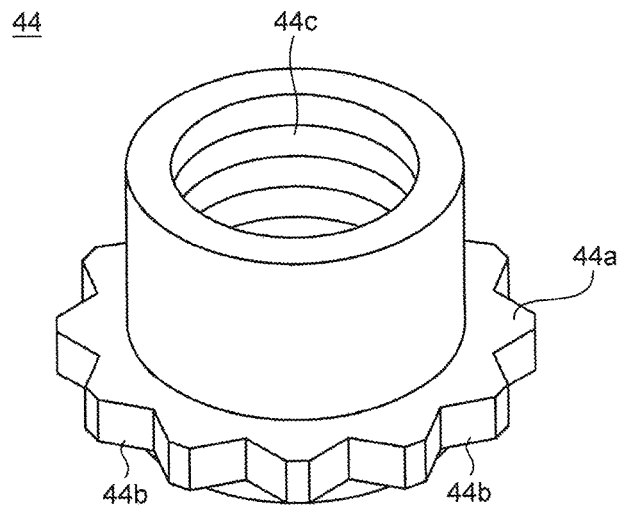
FIG. 5 is a perspective view of a nut to be disposed in the member for chassis.

The nut 44 has a flange part 44*a* projecting in the outer diameter direction from an axial portion of the outer peripheral face as shown in FIG. 5. The outer peripheral end face of the flange part 44*a* is formed into a corrugated shape in which an irregular shape 44*b* is formed along the circumferential direction.

As shown in FIG. 3, in the member for chassis 10, a recess 46 is formed by digging the surface of one fiber-reinforced resin plate 40 in the thickness direction in a portion inside the outside end face 30*a* of the laminated plate 30, and an axial one end of the nut 44 is disposed in the recess 46. The recess 46 has a depth so as to store a cylindrical portion of the nut 44 projecting more downward than the flange part 44*a* thereof.

Specifically, with the axial one end of the nut 44 inserted into the recess 46 and with the back surface of the flange part 44*a* disposed in abutment on the surface of the laminated plate 30, namely the surface of the fiber-reinforced resin plate 40 in the periphery of the recess 46, the surface of the laminated plate 30 and the circumference of the nut 44 excluding the portion around the opening of the thread part 44*c* are covered with the thermoplastic resin that forms the wide part 32*a*. Thereby, a gap between the inner peripheral face of the recess 46 and the outer peripheral face of the nut 44 is covered with the flange part 44*a*, thereby preventing the thermoplastic resin, which is injection-molded on the surface of the laminated plate 30 to form the wide part 32*a*, from entering the recess 46. Moreover, the outer peripheral face of the nut 44 is enclosed by a cylindrical boss part 48 raised from the surface of the laminated plate 30, and therefore the nut 44 is firmly positioned and fixed by the thermoplastic resin forming the wide part 32*a*.

Although the recess 46 is formed by cutting out one fiber-reinforced resin plate 40 into a circular shape in the thickness direction and digging down to a part of the intermediate layer 42 in this embodiment, the depth of the recess 46 can be appropriately changed as long as one end of the nut 44 is able to be disposed and the fiber-reinforced resin plate 40 does not always need to be cut out so as to extend to the entire thickness thereof.

As a procedure for a method of manufacturing the member for chassis 10 as described above, a pair of flat fiber-reinforced resin plates 40 and 41 are firstly prepared, and a flat intermediate layer 42 is sandwiched between them and thereafter pressed as a whole in the stacking direction, whereby the laminated plate 30 is formed. Subsequently, the laminated plate 30 is set in a mold and molten thermoplastic resin is filled into the mold cavity, so that the thermoplastic resin is injection-molded in such a way as to be brought into contact with the outside end face 30*a* of the laminated plate 30 to form the frame part 32.

Subsequently, the recess 46 for providing the female thread part is formed by machine processing or laser machining in a predetermined location of the laminated plate 30 in which the frame part 32 is joined with the outside end face 30*a*, and the nut 44 is disposed in the recess 46 and then set in another mold. Thereafter, the molten thermoplastic resin is filled into the mold cavity, so that the thermoplastic resin is injection-molded in such a way as to be brought into contact with the surface of the laminated plate 30 (fiber-reinforced resin plate 40) to form the wide part 32*a* where the nut 44 is insert-molded.

As a result, as shown in FIG. 3, the member for chassis 10 is formed, having the frame part 32 where thermoplastic resin is joined with the outside end face 30*a* of the laminated plate 30 and a wide part 32*a* where thermoplastic resin is joined with the surface of the laminated plate 30 and the nut 44 is insert-molded. In addition, it is also possible to collect the thermoplastic resin for forming the frame part 32 and the thermoplastic resin for forming the wide part 32*a* for holding the nut 44 together to mold them in one mold.

Subsequently, when the hinge 24 is screwed to the member for chassis 10, the hinge 24 is placed on the wide part 32*a* of the frame part 32 as shown in FIG. 4 and the thread part 36*a* of the fixing screw 36 is screwed together with the thread part 44*c* of the nut 44. This forms the rear-face cover 12*a* in which the hinge 24 is screwed and fixed to the member for chassis 10, and therefore the chassis 12 can be constructed by stacking the front-face cover 12*b* on the rear-face cover 12*a* and coupling than with each other.

As described above, the member for chassis 10 according to the present embodiment has a configuration in which the frame part 32 made of thermoplastic resin is joined with at least a part of the outside end face 30*a* of the laminated plate 30 in which the intermediate layer 42 is disposed between the pair of fiber-reinforced resin plates 40 and 41, wherein thermoplastic resin extends to the surface of the laminated plate 30 and wherein the nut 44 serving as a female thread part is provided in the thermoplastic resin extending to the surface of the laminated plate 30.

This provision of the nut 44 serving as the female thread part in the thermoplastic resin extending from the outside end face 30*a* of the laminated plate 30 to the surface thereof enables the nut 44 to be disposed to overlap the laminated plate 30 having higher strength than the frame part 32 formed of thermoplastic resin. Specifically, the high-strength laminated plate 30 is integrated with the nut 44 and the boss part 48. Thus, even if an external force F is applied to the rear-face cover 12*a*, which makes up the chassis 12, in the configuration where the hinge 24 is fastened and fixed to the nut 44 by screwing the fixing screw 36 together with the nut 44 as shown in FIG. 4, for example, the external force F can be received by the laminated plate 30 since the nut 44 and the boss part 48 holding the nut 44 are present on the laminated plate 30. This prevents large load from being applied to the frame part 32 formed of thermoplastic resin lower in strength than the laminated plate 30 or to the joint interface between the frame part 32 and the outside end face 30a of the laminated plate 30, thereby achieving the chassis 12 having high strength and increasing durability.

For example, in the case where an external force F is further applied in the opening direction to the lid 16 in the state where the lid 16 is opened to the maximum opening degree such as, for example, to the position of 180 degrees at which the lid 16 and the body 20 are parallel to each other, via the hinge 24 in the electronic device 14 according to the present embodiment, large load is applied to a portion between the rear-face cover 12a of the chassis 12 making up the lid 16 and the hinge 24 fastened and fixed to the ear-face cover 12a via the nut 44 and the fixing screw 36. In the electronic device 14, however, the nut 44 which is a fastening part of the hinge 24 is disposed so as to overlap the high-strength laminated plate 30, and therefore the external force F can be received by the high-strength laminated plate 30, thereby preventing load generated by the external force F from being directly applied to the frame part 32 formed of thermoplastic resin lower in strength than the laminated plate 30 or to the joint interface between the frame part 32 and the laminated plate 30. This enables a remarkable increase in the load bearing capacity up to the limit of a break of the frame part 32 or the joint interface between the frame part 32 and the laminated plate 30, in comparison with a configuration in which the nut 44 is insert-molded or the like in the frame part 32 as in the conventional configuration.

In the member for chassis 10, the laminated plate 30 has the recess 46 formed by digging the surface of one fiber-reinforced resin plate 40 in the thickness direction, and the axial one end of the nut 44 is disposed in the recess 46. This suppresses the height-direction projection amount of the nut 44 and the boss part 48 on the surface of the laminated plate 30, thereby enabling a reduction in the thickness of the member for chassis 10 and the thickness of the chassis 12 including the member for chassis 10 as far as possible.

The nut 44 has the flange part 44a projecting in the outer diameter direction from one axial portion of the outer peripheral face of the nut 44. The flange part 44a is disposed so that the back surface thereof abuts on the surface of one fiber-reinforced resin plate 40 and at least a part of the surface of the flange part 44a is covered with thermoplastic resin. Thereby, the recess 46 can be closed with the flange part 44a, thereby preventing the thermoplastic resin from entering the recess 46 to affect the intermediate layer 42 or the like. Moreover, the surface of the flange part 44a is covered with the boss part 48, thereby preventing the nut 44 from slipping off upward and thus increasing the fastening strength of the hinge 24 with the fixing screw 36. In this condition, the irregular shape 44b is provided on the outer peripheral end face of the flange part 44a of the nut 44, and therefore the thermoplastic resin entering a portion having the irregular shape 44b provides the detent of the nut 44 when the fixing screw 36 is fastened.

Figure 6:
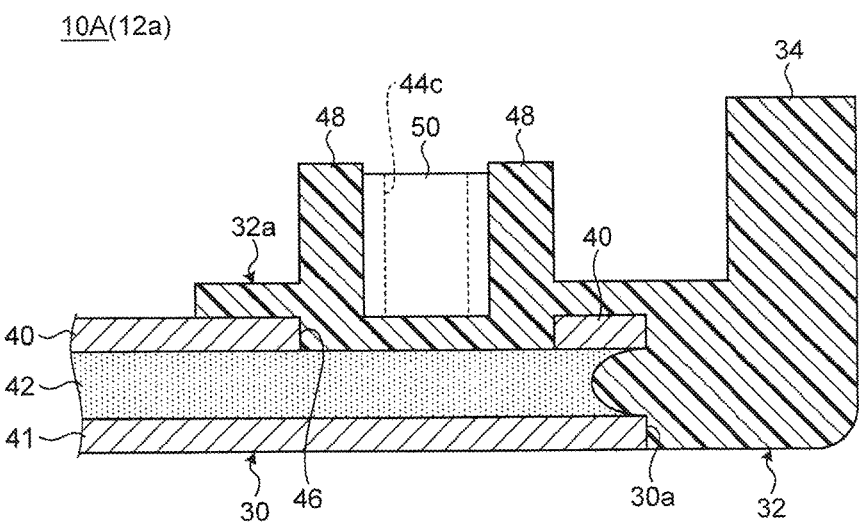
FIG. 6 is a cross-sectional view of a portion including a laminated plate and a frame part of a member for chassis according to a first variation.

FIG. 6 is a cross-sectional view in the thickness direction of a portion including a laminated plate 30 and a frame part 32 (a wide part 32a) of a member for chassis 10A according to a first variation.

As shown in FIG. 6, in the member for chassis 10A, a nut 50 having a general structure without a flange part 44a is insert-molded so as to overlap the surface of a laminated plate 30. Specifically, in the member for chassis 10A, a recess 46 is formed by digging the surface of one fiber-reinforced resin plate 40 in the thickness direction in a portion inside the outside end face 30a of the laminated plate 30, the nut 50 is disposed in a position overlapping the recess 46, and thermoplastic resin filled into the recess 46 holds the nut 50 so as to cover an axial one end thereof. In addition, the nut 44 (see FIG. 5) may be used, instead of the nut 50.

Therefore, also in the member for chassis 10A, the nut 50 is able to be disposed so as to overlap the laminated plate 30 having higher strength than the frame part 32 formed of thermoplastic resin, thereby achieving high strength and increasing durability. Furthermore, this configuration suppresses the height-direction projection amount of the nut 50 on the surface of the laminated plate 30, thereby enabling a reduction in the thickness of the member for chassis 10A and the thickness of the chassis 12 including the member for chassis 10A as far as possible.

Figure 7:
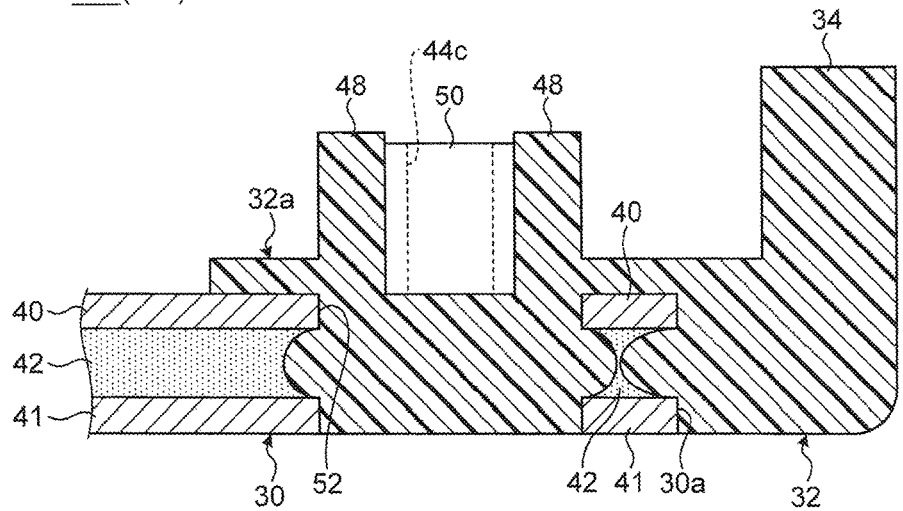
FIG. 7 is a cross-sectional view of a portion including a laminated plate and a frame part of a member for chassis according to a second variation.

FIG. 7 is a cross-sectional view in the thickness direction of a portion including a laminated plate 30 and a frame part 32 (a wide part 32a) of a member for chassis 10B according to a second variation.

As shown in FIG. 7, in the member for chassis 10B, a through-hole 52 is formed in the laminated plate 30 so that the through-hole 52 penetrates through a pair of fiber-reinforced resin plates 40 and 41 and an intermediate layer 42 in the thickness direction, the nut 50 is disposed in a position overlapping the through-hole 52, and thermoplastic resin filled, into the through-hole 52 holds the nut 50 so as to cover an axial one end of the nut 50. In addition, the nut 44 (see FIG. 5) may be used, instead of the nut 50.

Therefore, also in the member for chassis 10B, the nut 50 is able to be disposed so as to overlap the laminated plate 30 having higher strength than the frame part 32 formed of thermoplastic resin, thereby achieving high strength and increasing durability. Specifically, although the nut 50 is disposed so as to overlap the through-hole 52 of the laminated plate 30, the nut 50 is disposed in a position inside the outside end face 30a of the laminated plate 30 and therefore, in the case where an external force F as shown in FIG. 4 is applied to the nut 50, the laminated plate 30 is able to receive the external force F in the same manner as in the case of the members for chassis 10 and 10A. Furthermore, this configuration suppresses the height-direction projection amount of the nut 50 on the surface of the laminated plate 30, thereby enabling a reduction in the thickness of the member for chassis 10B and the thickness of the chassis 12 including the member for chassis 10B as far as possible.

Figure 8:
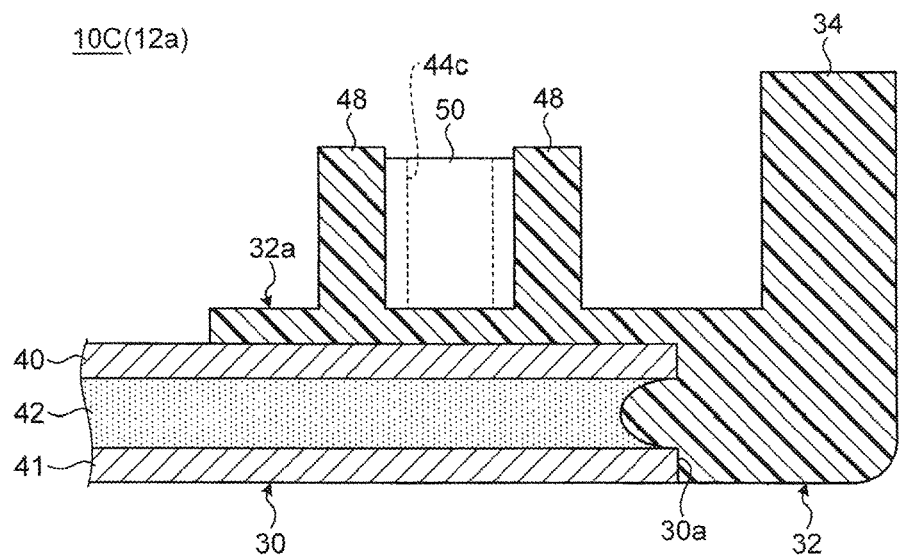
FIG. 8 is a cross-sectional view of a portion including a laminated plate and a frame part of a member for chassis according to a third variation.

FIG. 8 is a cross-sectional view in the thickness direction of a portion including a laminated plate 30 and a frame part 32 (wide part 32a) of a member for chassis 10C according to a third variation.

As shown in FIG. 8, in the member for chassis 10C, the laminated plate 30 is not provided with the recess 46 (see FIGS. 3 and 6) and the through-hole 52 (see FIG. 7), but instead a boss part 48 is formed by extending thermoplastic resin that forms the frame part 32 on the surface of the laminated plate 30 and a nut 50 is insert-molded. In addition, the nut 44 (see FIG. 5) may be used, instead of the nut 50.

Therefore, also in the member for chassis 10C, the nut 50 is able to be disposed so as to overlap the laminated plate 30 having higher strength than the frame part 32 formed of thermoplastic resin, thereby achieving high strength and increasing durability. Incidentally, in the member for chassis 10C, the nut 50 (44) is insert-molded by injection-molding thermoplastic resin on the surface of the laminated plate 30, and therefore the entire thickness is larger than the aforementioned members for chassis 10, 10A, and 10B. The member for chassis 10C, however, does not require any construction work for the recess 46 and the like, thereby further suppressing the manufacturing cost advantageously.

The present invention is not limited to the above-mentioned embodiment, and naturally can be freely changed without departing from the spirit of the present invention specified in the claims.

For example, in the above embodiment, the member for chassis 10 is used as the rear-face cover 12a of the chassis 12 of the lid 16 making up the electronic device 14. Instead, the member for chassis 10 may be used for the front-face cover 12b or for the body 20. The member for chassis 10 further can be used as a member for chassis of various types of electronic devices, such as a desktop PC, a tablet PC, a smartphone or a mobile phone, and the like. Furthermore, the female thread part (nut 44, 50) making up the member for chassis 10 may be used for purposes other than fastening the hinge 24. For example, it may be used as a female thread part for fastening the front-face cover 12b to the rear-face cover 12a made up of, for example, the member for chassis 10.

The above embodiment describes the member for chassis 10 including the three-layered laminated plate 30 as one example. Instead, however, the member for chassis may have a five or more-layered lamination structure in which the intermediate layer 42 is sandwiched between each pair of three or more fiber-reinforced resin plates 40 and 41, for example.

The above embodiment describes the configuration in which the nut 44 is insert-molded by using thermoplastic resin making up the wide part 32a as one example. Instead, however, the female thread part may be formed by directly forming a thread in the thermoplastic resin making up the wide part 32a.

As has been described, the present disclosure provides an improved member for chassis to be employed by electronic devices.

While the disclosure has been particularly shown and described with reference to a preferred embodiment, it will be understood by those skilled in the art that various changes in form and detail may be made therein without departing from the spirit and scope of the disclosure.

What is claimed is:

1. A member for chassis comprising:
a laminated plate having an intermediate layer disposed between a first and second fiber-reinforced resin plates, wherein said first fiber-reinforced resin plate includes a recess;
a thermoplastic resin frame part joined with at least a part of an outside end face of said laminated plate, wherein said thermoplastic resin frame part extends to a surface of said first fiber-reinforced resin plate of said laminated plate, wherein said thermoplastic resin frame part includes a cylindrical boss part having an opening aligned with said recess in said first fiber-reinforced resin plate; and
a female thread part located within said opening of said cylindrical boss part of said thermoplastic resin and said recess of said first fiber-reinforced resin plate of said laminated plate.

2. The member for chassis of claim 1, wherein said female thread part is a nut integrated with said thermoplastic resin frame part by insert-molding.

3. The member for chassis of claim 1, wherein said recess within said first fiber-reinforced resin plate is formed by burrowing said surface of said first fiber-reinforced resin plates in a thickness direction.

4. The member for chassis of claim 2, wherein said nut is disposed in said recess of said first fiber-reinforced resin plate at its axial one end.

5. The member for chassis of claim 2, wherein said nut includes a flange part projecting in an outer diameter direction from one axial portion of its outer peripheral face, and said flange part is disposed so that one surface thereof abuts on said surface of said first fiber-reinforced resin plate.

6. The member for chassis of claim 5, wherein an irregular shape is provided on an outer peripheral end face of said flange part.

7. The member for chassis of claim 5, wherein at least a part of said surface of said flange part is covered with said thermoplastic resin frame part.

8. The member for chassis of claim 1, wherein said female thread part includes a fixing screw located within.

9. The member for chassis of claim 8, wherein said cylindrical boss part of said thermoplastic resin frame part is located within an opening of a hinge.

10. The member for chassis of claim 9, wherein said screw secures said hinge to said thermoplastic resin frame part.

11. An electronic device comprising:
a display;
a keyboard; and
a member for chassis containing said display and keyboard, wherein said member for chassis includes:
a laminated plate having an intermediate layer disposed between a first and second fiber-reinforced resin plates, wherein said first fiber-reinforced resin plate includes a recess;
a thermoplastic resin frame part joined with at least a part of an outside end face of said laminated plate, wherein said thermoplastic resin frame part extends to a surface of said first fiber-reinforced resin plate of said laminated plate, wherein said thermoplastic resin frame part includes a cylindrical boss part having an opening aligned with said recess in said first fiber-reinforced resin plate; and
a female thread part located within said opening of said cylindrical boss part of said thermoplastic resin and said recess of said first fiber-reinforced resin plate of said laminated plate.

12. The electronic device of claim 11, wherein said female thread part is a nut integrated with said thermoplastic resin frame part by insert-molding.

13. The electronic device of claim 11, wherein said recess within said first fiber-reinforced resin plate is formed by burrowing said surface of said first fiber-reinforced resin plate in a thickness direction.

14. The electronic device of claim 12, wherein said nut is disposed in said recess of said first fiber-reinforced resin plate at its axial one end.

15. The electronic device of claim 12, wherein said nut includes a flange part projecting in an outer diameter direction from one axial portion of its outer peripheral face, and said flange part is disposed so that one surface thereof abuts on said surface of said first fiber-reinforced resin plate.

16. The electronic device of claim 15, wherein an irregular shape is provided on an outer peripheral end face of said flange part.

17. The electronic device of claim 15, wherein at least a part of said surface of said flange part is covered with said thermoplastic resin frame part.

18. The electronic device of claim 11, wherein said female thread part includes a fixing screw located within.

19. The electronic device of claim 18, wherein said cylindrical boss part of said thermoplastic resin frame part is located within an opening of a hinge.

20. The electronic device of claim 19, wherein said screw secures said hinge to said thermoplastic resin frame part.

* * * * *